Sept. 17, 1957     J. GRAZIANI     2,806,941
WALL LAMP
Filed March 30, 1956
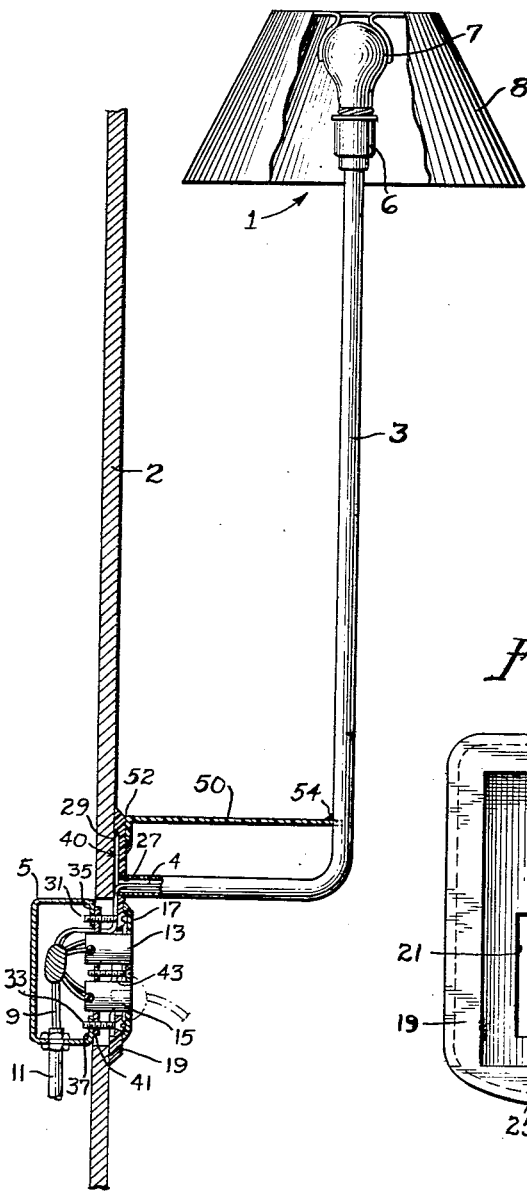
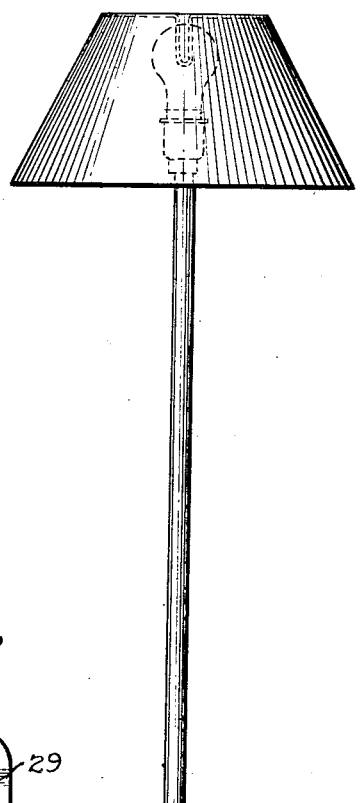
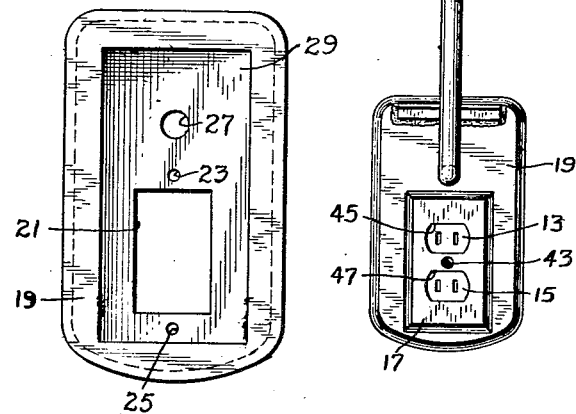
Inventor
Joseph Graziani
By Kegan and Kegan
Attys.

United States Patent Office 2,806,941
Patented Sept. 17, 1957

2,806,941
WALL LAMP
Joseph Graziani, Steger, Ill.
Application March 30, 1956, Serial No. 575,073
3 Claims. (Cl. 240—73)

This invention relates to an electrical wall lamp and mounting, particularly designed and adapted for ready attachment to existing electrical wall outlets.

The invention is particularly concerned with a fixture for attachment by the usual screws to a standard outlet box, through which the ends of electrical conductors are readily available for connection to the wires and socket for the reception of an electric light bulb.

The primary object of the invention is to provide an improved arrangement for connecting a lamp to a wall outlet, and a simplified means for mounting the wall lamp on the wall outlet and junction box. A further object of the invention is to provide a wall lamp which is mounted on a wall outlet and which permits free access for other appliances to the electrical outlets.

Other objects and advantages of the invention will become more readily apparent from a reading of the description following hereinafter, and from an examination of the drawings, in which:

Figure 1 is a side elevational view, partly in cross section, of a wall lamp embodying the invention, Figure 2 is a front view of the wall lamp shown in Figure 1, and Figure 3 is a rear view of the cover plate of the invention.

According to the invention, a wall lamp is mounted directly onto a wall outlet by means of a wall plate which permits ready access to the existing electrical outlets.

As more clearly shown in Figure 1, a wall lamp 1, of the "pin-up" type is affixed at the end of a supporting rod 3. The supporting rod 3 serves as a conduit for the electrical wires 4, which lead from the junction box 5 to the lamp receptacle or socket 6. A bulb 7 is mounted within the socket 6, and a lamp shade 8, e. g. of the "clip-on" type, is affixed over the bulb 7.

The junction box 5 is mounted within the building wall 2, within a construction bay. The junction box 5 is of the usual type which houses electrical lead-in wires 9, which connect the junction box 5 electrically with the source of power (not shown) by a shielded cable 11. As is readily apparent to those skilled in the art, the junction box may ordinarily carry two female electrical outlets 13 and 15.

In order to apply the wall lamp of the invention to such a conventional junction box 5, the cover plate 17 of the junction box is removed, and replaced by a wall plate 19. The wall plate 19 is affixed to the junction box by fasteners 31 and 33, which are usually threaded fasteners which thread into openings 35 and 37, respectively, in the bracket portions of the junction box 5. The wall plate 19 has a hollowed out portion 29 which spaces the wall plate 19 from the wall 2 in the vicinity of the junction box. Thus, a chamber or passageway 40 is provided between the surface of the wall 2 and the inner surface of the wall plate 19 in the vicinity of the junction box. The electrical conductors 4 can thus lead from the conduit 3, through the passageway 40, into the junction box 5. The conduit 3 is affixed to the wall plate 19 within the opening 27 therein (see Figure 3).

As more fully shown in Figure 3, the wall plate 19 has a cut-away portion 21 which, when the wall plate is mounted upon the wall, allows for ready access to the female electrical outlets. Holes 23 and 25 in the wall plate permit the passage of fasteners 31 and 33, respectively, for connection to the junction box, as above explained.

With the wall plate 19 in position, the junction box cover plate 17 can then be mounted over the opening 21 in wall plate 19, and fastened to the cross bracket 41, carrying the female electrical outlets 13 and 15, by means of a fastening 43. As clearly shown in Figure 2, the openings 45 and 47 in the cover plate 17 permit ready access to the female electrical connections 13 and 15, respectively.

The conduit 3 may be of a rigid metallic construction or of a plastic material, and is bonded in any convenient manner within the opening 27 in wall plate 19. If desired, a reinforcing bracket 50 may be affixed to the wall plate 19 at its upper end, as at 52, and also may be affixed to the conduit 3 as at 54. The bracket 50 may be of such width as to provide a small shelf for the reception of any desired small articles.

By means of the wall lamp unit of the invention the outlets on the junction box are undisturbed and can be used for the connection and operation of any desired appliances, while the electrical connections from the wall lamp are simply and quickly connected into the junction box. By means of the passageway 40, above described, it is not necessary to break away any further portions of the wall 2, since the conductors 4 can be lead readily through passage 40 into and within the junction box 5.

The invention thus provides a simple and economical wall lamp fixture which can be mounted upon an existing junction box without using any other tools than a screw driver. It is not necessary to break away further portions of the wall nor to discard any of the portions of the existing outlets and junction box. It will be readily apparent to those skilled in the art that many modifications and variations in the structure of the wall lamp unit above described may be made while still coming within the scope of the invention.

For example, the wall fixture of the invention may be mounted over a wall outlet bearing a light switch rather than female electrical conductors. In that event the light switch member will protrude past the wall plate 19 of the invention.

What I claim is:

1. A lamp fixture mountable to a wall installed electrical junction box having a female electrical connector and a cover plate with an opening providing access to said connector, said fixture comprising: a wall plate and fasteners for mounting the same to said junction box, said wall plate including a central forwardly projecting body portion surrounded at its periphery by an integral flat flange abuttable with the wall whereat said plate is mounted, said body portion further including a cut-out section providing access to said connector, and a second cut-out section vertically spaced from said first cut-out section; a relatively long and thin upwardly extending hollow pedestal connected at its lower end to said wall plate at said second cut-out section and provided at its upper end with a lamp socket; electrical conductors leading from said socket through said pedestal and said second cut-out section and connectable with the power supply at said junction box; and a fastener for clamping the cover plate to the outer surface of said wall plate at said first cut-out section, whereby use and access to said connector is had while said junction box additionally provides power to said fixture.

2. The combination, with a wall installable electrical junction box, female electrical outlets therein and connectors for joining the same to a power supply, and a cover plate with openings providing access to said outlets; of a relatively long, thin and rigid upwardly extending hollow pedestal, an electrical socket at the upper end thereof, a wall plate including a central forwardly projecting body portion surrounded by an integral laterally projecting flat flange abuttable with the surrounding wall whereat said junction box is mounted to provide a passage between the wall plate inner surface and said wall, a screw threadably engageable with said junction box for clamping said wall plate to said wall and over said junction box, a first cut-out section in said wall plate wherein said pedestal is fixably mounted at its lower end, electrical conductors leading from said socket through said pedestal and said passage for connection to the power supply at said junction box, a second cut-out section in said wall plate providing access to said outlets, said cover plate being mountable on said wall plate over said second cut-out section, and a screw threadably engageable with said junction box for clamping said cover plate on said wall plate, whereby said junction box provides power both through said outlets and to said fixture.

3. A wall lamp fixture for use with a wall installed electrical junction box, female electrical outlets therein, and a cover plate with openings providing access to said outlets, said fixture consisting of: a relatively long and thin upwardly extending hollow pedestal, an electrical lamp socket at the upper end thereof, a wall plate including a central forwardly projecting body portion having a length and width greater than the corresponding respective dimensions of said junction box, a laterally projecting flat flange at the periphery of said central body portion surrounding the same and integral therewith, and abuttable with the surrounding wall whereat said junction box is mounted to provide a passage between the wall plate inner surface and said wall, a screw passing through said wall plate and threadably engageable with said junction box for clamping said wall plate to said wall and over said junction box, a first cut-out section in said wall plate wherein said pedestal is affixed at its lower end for mounting to said wall plate, electrical conductors leading from said socket through said pedestal and said passage for connection to a source of power at said junction box, a brace extending horizontally from said wall plate to said pedestal to provide rigidity to said pedestal, a second rectangular shaped cut-out section in said wall plate, providing access therethrough to said outlets, vertically spaced below said first cut-out section, and having a length and width slightly less than the corresponding dimensions of said cover plate whereby said cover plate is mountable on said wall plate, and a screw threadably engageable with said junction box for clamping said cover plate on said wall plate.

References Cited in the file of this patent
UNITED STATES PATENTS

| | | |
|---|---|---|
| 1,757,820 | Thomas | May 6, 1930 |
| 2,385,620 | Fleckenstein | Sept. 25, 1945 |
| 2,596,626 | Vogel | May 13, 1952 |